United States Patent
Busse et al.

(10) Patent No.: US 8,966,548 B2
(45) Date of Patent: Feb. 24, 2015

(54) ALTERNATIVE MEDIA PRESENTATION DEVICE RECOMMENDATION

(71) Applicant: Verizon Patent and Licensing Inc., Basking Ridge, NJ (US)

(72) Inventors: Martin A. Busse, Woburn, MA (US); Gaurav D. Mehta, Brookline, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 13/897,888

(22) Filed: May 20, 2013

(65) Prior Publication Data
US 2014/0344848 A1    Nov. 20, 2014

(51) Int. Cl.
| | |
|---|---|
| *H04N 7/18* | (2006.01) |
| *H04N 21/41* | (2011.01) |
| *H04N 21/442* | (2011.01) |
| *H04N 21/45* | (2011.01) |
| *H04W 8/00* | (2009.01) |
| *H04W 68/00* | (2009.01) |
| *H04N 9/00* | (2006.01) |
| *H04N 7/16* | (2011.01) |
| *H04W 36/00* | (2009.01) |
| *H04W 24/00* | (2009.01) |
| *H04W 56/00* | (2009.01) |

(52) U.S. Cl.
CPC ..... *H04N 21/4122* (2013.01); *H04N 21/44227* (2013.01); *H04N 21/4516* (2013.01); *H04W 8/005* (2013.01); *H04W 36/00* (2013.01); *H04W 68/00* (2013.01); *H04W 56/00* (2013.01)
USPC ............ 725/80; 725/14; 725/62; 725/81; 709/224; 709/237; 455/436; 455/439; 455/440; 455/456.1

(58) Field of Classification Search
CPC .............. H04N 21/4122; H04N 21/44227; H04N 21/4516; H04W 8/005; H04W 36/00; H04W 56/00; H04W 68/00
USPC ............ 725/80, 81, 62, 14; 709/224, 237; 455/436, 439, 440, 456.1
See application file for complete search history.

(56) References Cited

U.S. PATENT DOCUMENTS

| | | | |
|---|---|---|---|
| 2005/0262254 A1* | 11/2005 | Sherwani | 709/231 |
| 2006/0031559 A1* | 2/2006 | Sorokopud et al. | 709/232 |
| 2009/0254839 A1* | 10/2009 | Kripalani et al. | 715/753 |
| 2012/0311038 A1* | 12/2012 | Trinh et al. | 709/204 |

* cited by examiner

*Primary Examiner* — Hoang-Vu A Nguyen-Ba

(57) ABSTRACT

A first user device receives, from a service provider network, digital media content and presents the digital media content to a user. The first user device receives, from the service provider network, an indication that a second user device, associated with an account of the user and providing a higher quality presentation, is available to present the digital media content. The first user device presents a notice to the user that the second user device is available. In one aspect, the notice to the user is be selected by the user to initiate a switch to the second user device.

23 Claims, 9 Drawing Sheets

ALTERNATIVE MEDIA PRESENTATION DEVICE RECOMMENDATION

BACKGROUND

Media playback services may be made available on a variety of user devices, including mobile devices and fixed devices that are configured to receive media via the Internet. User devices typically require trade-offs. Some user devices (e.g., a smart phone) may offer greater mobility while sacrificing screen size and/or picture quality. Conversely, some fixed devices (e.g., a connected television) may provide better picture quality and screen size without mobility. Furthermore, some user devices may be shared among multiple users. Thus, when a variety of user devices are available, multiple factors may influence selection of a user device to access media playback services.

DETAILED DESCRIPTION OF PREFERRED EMBODIMENTS

The following detailed description refers to the accompanying drawings. The same reference numbers in different drawings may identify the same or similar elements.

Figure 1:
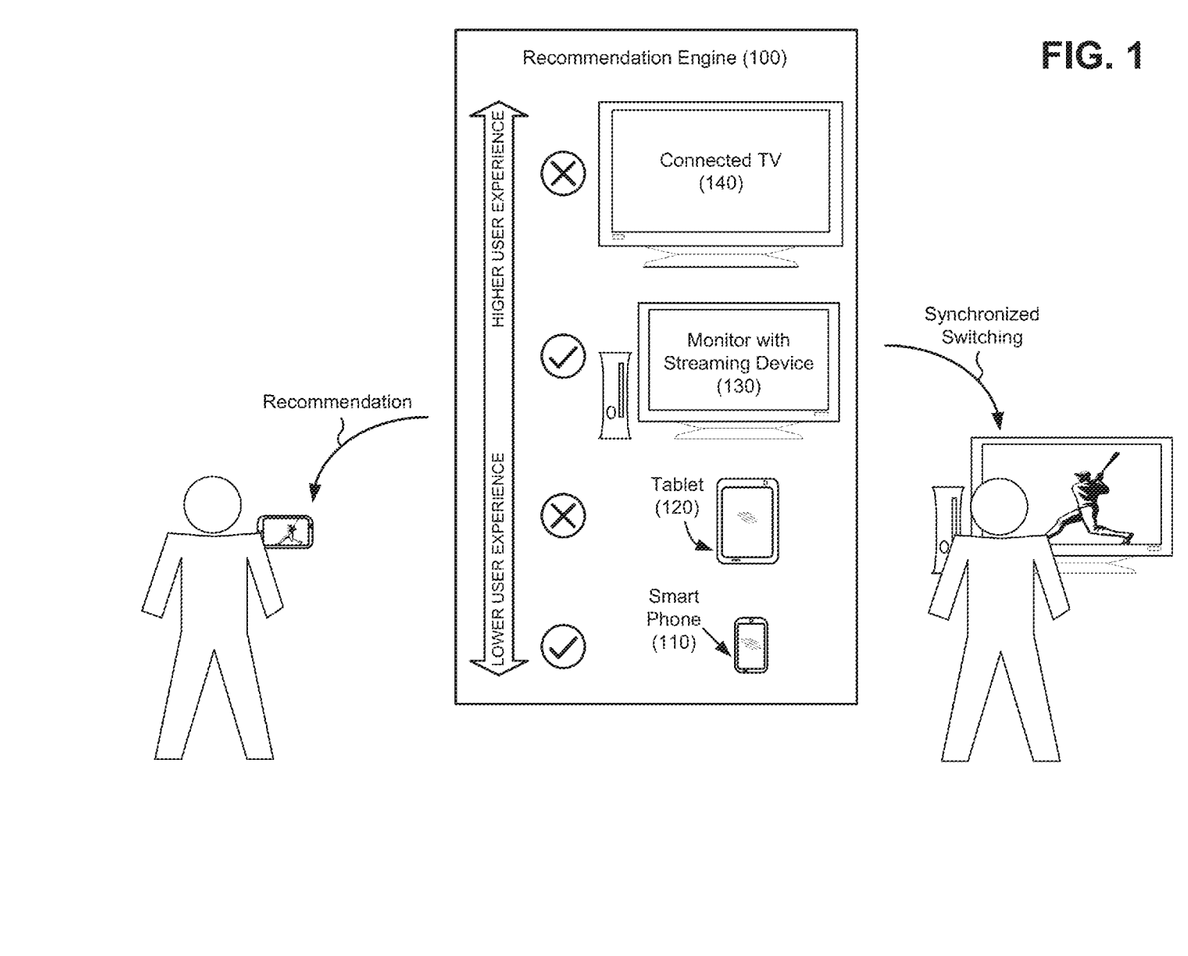
FIG. 1 is an illustration of a concept described herein.

Systems, and/or methods/or described herein may provide a recommendation engine to suggest and enable switching of media streams between different user devices to promote an optimal viewing experience. FIG. 1 provides an illustration of concepts described herein. Referring to FIG. 1, different types of user devices (e.g., a smart phone 110, a tablet device 120, a monitor connected through a streaming device 130, and a connected television 140), associated with a particular user account, may be registered with a service provider. Each user device may be configured to access digital media content via, for example, the Internet. Each user device may also have certain capabilities and/or features (e.g., screen size, picture quality, bandwidth, etc.) that provide a better user experience for consuming particular types of digital media content under particular conditions. In a recommendation engine 100, these capabilities may be associated with each type of device.

A user may begin consuming digital media content on a first user device (e.g., smart phone 110). Digital media content may include, for example, streaming media (e.g., live events or pre-recorded video) or interactive media (e.g., games, educational tools, etc.). The recommendation engine 100 may monitor the availability and proximity of the other registered user devices (e.g., tablet device 120, monitor/streaming device 130, and connected television 140), along with the type of content being consumed. If a user device that is capable of providing a better user experience (e.g., monitor/streaming device 130) becomes available, recommendation engine 100 may provide a recommendation via the current user device (e.g., smart phone 110) to switch to the other available user device (e.g., monitor/streaming device 130). Recommendation engine 100 may also enable seamless synchronized switching to allow the user to switch from the first user device (e.g., smart phone 110) to the second user device (e.g., monitor/streaming device 130) and resume presentation of the content on the second user device from the point where it left off on the first user device.

As described further herein, recommendation engine 100 may be included within individual user devices, included within backend servers (e.g., associated with a service provider network), or distributed among a combination of user devices and backend servers.

Figure 2:
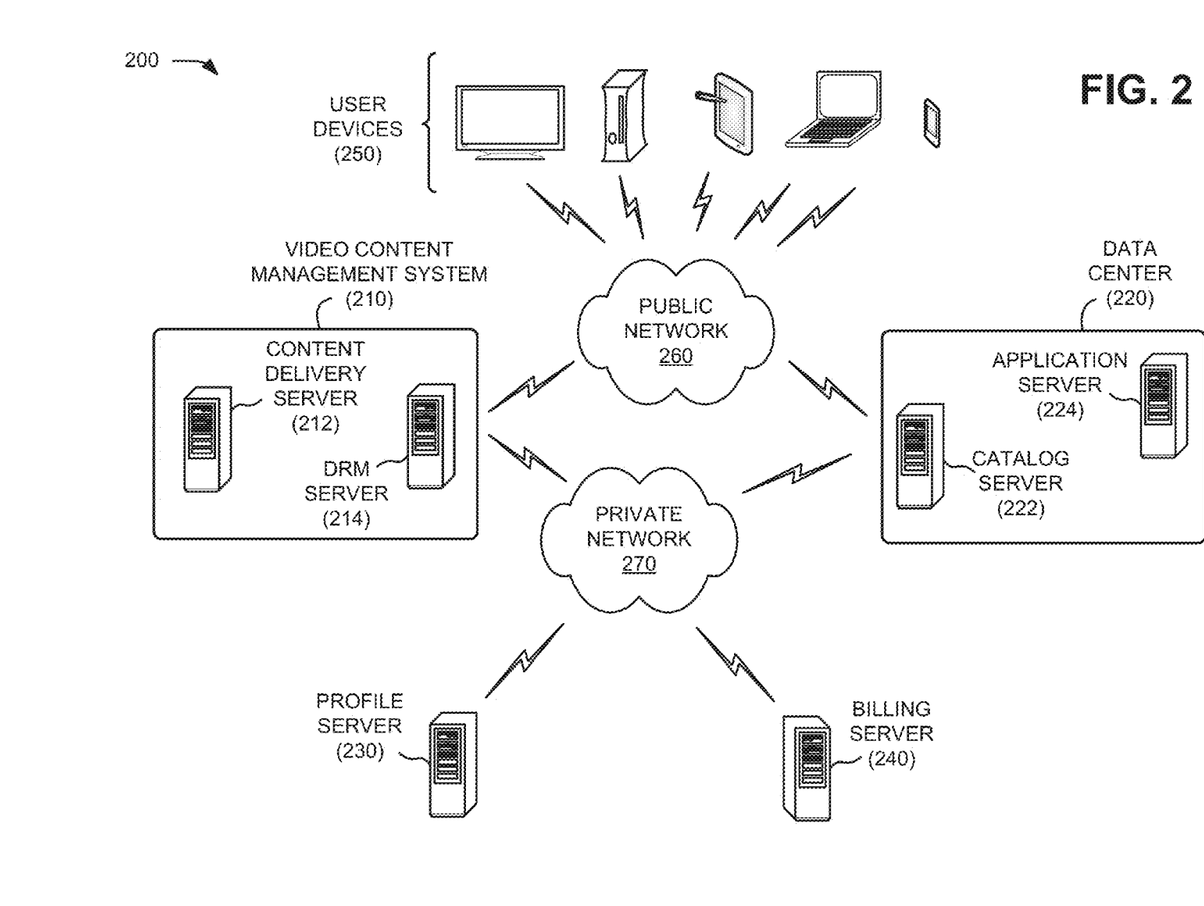
FIG. 2 is a diagram of an exemplary network in which systems and/or methods described herein may be implemented.

FIG. 2 is an exemplary network 200 in which concepts described herein may be implemented. Network 200 may generally represent user devices connected to a video content distribution network. As illustrated, network 200 may include a video content management system (VCMS) 210, a data center 220, a profile server 230, a billing server 240, user devices 250 (referred to herein collectively as "user devices 250," generically as "user device 250," or individually as "user device 250-x"), an access network 260, and a private network 270. The particular arrangement and number of components of network 200 shown in FIG. 2 are illustrated for simplicity. In practice there may be more video content management systems 210, data centers 220, profile servers 230, user devices 250, and/or networks 260/270. Components of network 200 may be connected via wired and/or wireless links.

VCMS 210 may include one or more network devices, or other types of computation or communication devices, to aggregate content and content metadata, process content, and distribute content. In one implementation, VCMS 210 may include a content delivery server 212 and a digital rights management (DRM) server 214. VCMS 210 may aggregate content and transcode content into a digital format suitable for consumption on particular user devices 250. For example, VCMS 210 may include a transcoding device to convert a video file from one format to another (e.g., from one bit rate to another bit rate, from one resolution to another, from one standard to another, from one file size to another, etc.). VCMS 210 may also encrypt data and communicate with DRM server 214 to enforce digital rights.

Content delivery server 212 may include one or more network devices, or other types of computation or communication devices, to deliver digital content to user devices 250. In one implementation, content delivery server 212 may include a streaming server that provides streaming data packets (e.g., via a media playback uniform resource locator (URL)) to user devices 250 (e.g., via network 260). In one implementation, a media playback URL may be session-based, such that each URL can be used only once for one user device 250 for security purposes.

DRM server 214 may include one or more network devices, or other types of computation or communication devices, to issue, validate, and/or enforce DRM licenses to a client, such as an application running on one of user devices 250. In implementations described herein, DRM server 214 may communicate with user device 250 to authenticate a user of user device 250, the particular user device 250, and/or an application residing on user device 250. For example, DRM server 214 may request/receive login information associated with the user, and compare the login information with stored information to authenticate the user. Additionally, or alternatively, DRM server 214 may request/receive device information (e.g., a unique device identifier) associated with user device 250, and may compare the device information with stored information to authenticate user device 250.

Data center 220 may include one or more network devices, or other types of computation or communication devices, to manage the authorization, selection, and/or purchase of multimedia content by a user of user devices 250. As shown in FIG. 2, data center 220 may include a catalog server 222 and an application server 224. In one implementation, data center 220 may be accessed by user devices 250 via access network 260.

Catalog server 222 may include one or more network devices, or other types of computation or communication devices (e.g., a server device, an application server device, a Web server device, a database server device, a computer, etc.), to provide a unified catalog of both digital and physical content for users (e.g., of user devices 250) to consume (e.g., buy, rent, or subscribe). In one implementation, catalog server 222 may collect and/or present listings of video content available to user devices 250. For example, catalog server 222 may receive digital and/or physical content metadata, such as lists or categories of content, from VCMS 210 and/or a physical asset distribution system (not shown). Catalog server 222 may use the content metadata to provide currently-available content options to user devices 250. Catalog server 222 may provide the content metadata to user device 250 directly or may communicate with user device 250 via application server 224.

Application server 224 may include one or more network devices, or other types of computation or communication devices (e.g., a server device, an application server device, a Web server device, a database server device, a computer, etc.), that includes a collection of hardware and/or software components to provide a backend support system for client applications residing on user devices 250. For example, application server 224 may permit user device 250 to download a video application that may permit a user to find content of interest or play downloaded or streaming content. The video application may enable user device 250 to present to a user of user device 250 information received from data center 220 in an interactive format to allow selection of particular digital or physical content. Additionally, or alternatively, application server 224 may provide content metadata, such as lists or categories of content. Also, application server 224 may authenticate a user who desires to purchase, rent, or subscribe to digital or physical content. In one implementation, application server 224 may receive, from a user device 250, a request for a link to a content selection and may provide a URL link to the content selection with formatting that is suitable for the particular user device 250. Interactions between application server 224 and user device 250 may be performed, for example, using hypertext transfer protocol (HTTP) or secure HTTP (HTTPS) via access network 260.

Profile server 230 may include one or more network devices, or other types of computation or communication devices, to store user profile information for users (e.g., users having accounts with a service provider). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, client device identifiers (e.g., a media player identifier, a mobile device identifier, a set top box identifier, a personal computer identifier, etc.) for user devices 250, a video application identifier associated with the video application obtained from application server 224, or the like. Application server 224 may use the user profile information from profile server 230 to authenticate a user and may update the user profile information based on the user's activity (e.g., with a user's express permission). In an exemplary implementation, profile server 230 may receive status updates from user devices 250 and inform other user devices 250 (e.g., user devices associated with the same user account) of the availability of other devices. In another exemplary implementation, profile server 230 may provide a recommendation to a particular user device 250 that another user device 250 is available to view currently presented content with a better user experience.

Billing server 240 may include one or more network devices, or other types of computation or communication devices, to manage charging users for services provided via network 200. Billing server 240 may include, for example, a payment processing component, a billing component, and/or a settlement component.

VCMS 210, content delivery server 212, DRM server 214, data center 220, catalog server 222, application server 224, profile server 230, and billing server 240 may be referred to herein generally as backend servers associated with a service provider network.

User device 250 may include a computation or communication device to enable a user to consume video content. User device 250 may include, for example, smart phone 110, tablet device 120, monitor/streaming device 130, or connected television 140 of FIG. 1. In other implementations, user device 250 may generally include a personal communications system (PCS) terminal, a personal computer, a laptop computer, a gaming console, a vehicular communication system, an Internet television, a digital video recorder (DVR) rental terminal, or other types of computation or communication devices configured to receive over-the-top (OTT) delivery of video content. In one implementation, user device 250 may include a client-side application that enables user device 250 to communicate with, for example, VCMS 210 and/or data center 220 and present information received from VCMS 210/data center 220 to a user. The client-side application may permit a user of user device 250 to log into an account (e.g., via application server 224), access catalog information (e.g., from catalog server 222), submit an order, and/or consume live streaming or downloaded video content (e.g., from VCMS 210). The client-side application may also present recommendations to a user when another user device 250 becomes available for present currently-consumed content. According to implementations described herein, two or more user devices 250 may be associated with a single user account (e.g., via a registration process with application server 224).

In another aspect, user device 250 may be implemented via a web browser or other software (e.g., executed on a personal computer). As a web browser platform, for example, user device 250 may not be a device that could be recommended as a substitute device (since the device running the web browser might not belong to the user). However, the web browser platform could be a user device 250 from which a user may receive a recommendation to switch to another user device 250 with an improved user experience.

Access network 260 may include a local area network (LAN), a wide area network (WAN), such as a cellular network, a satellite network, a fiber optic network, or a combination of the Internet and a private WAN, etc. that is used to transport data. Although shown as a single element in FIG. 2, access network 260 may include a number of separate networks that provide services to user devices 250.

Private network 270 may include, for example, one or more private IP networks that use a private IP address space. Private network 270 may include a local area network (LAN), an intranet, a private wide area network (WAN), etc. In one implementation, private network 270 may implement one or more Virtual Private Networks (VPNs) for providing communication between, for example, any of VCMS 210, data center 220, profile server 230, and/or billing server 240. Private network 270 may be protected and/or separated from other networks, such as access network 260, by a firewall. Although shown as a single element in FIG. 2, private network 270 may include a number of separate networks.

Although FIG. 2 shows exemplary components of network 200, in other implementations, network 200 may include fewer components, different components, differently-arranged components, and/or additional components than those depicted in FIG. 2. Alternatively, or additionally, one or more components of network 200 may perform one or more tasks described as being performed by one or more other components of network 200. For example, in one implementation, the functions of catalog server 222 and application server 224 may be combined in a single device or distributed among a group of devices.

Figure 3:
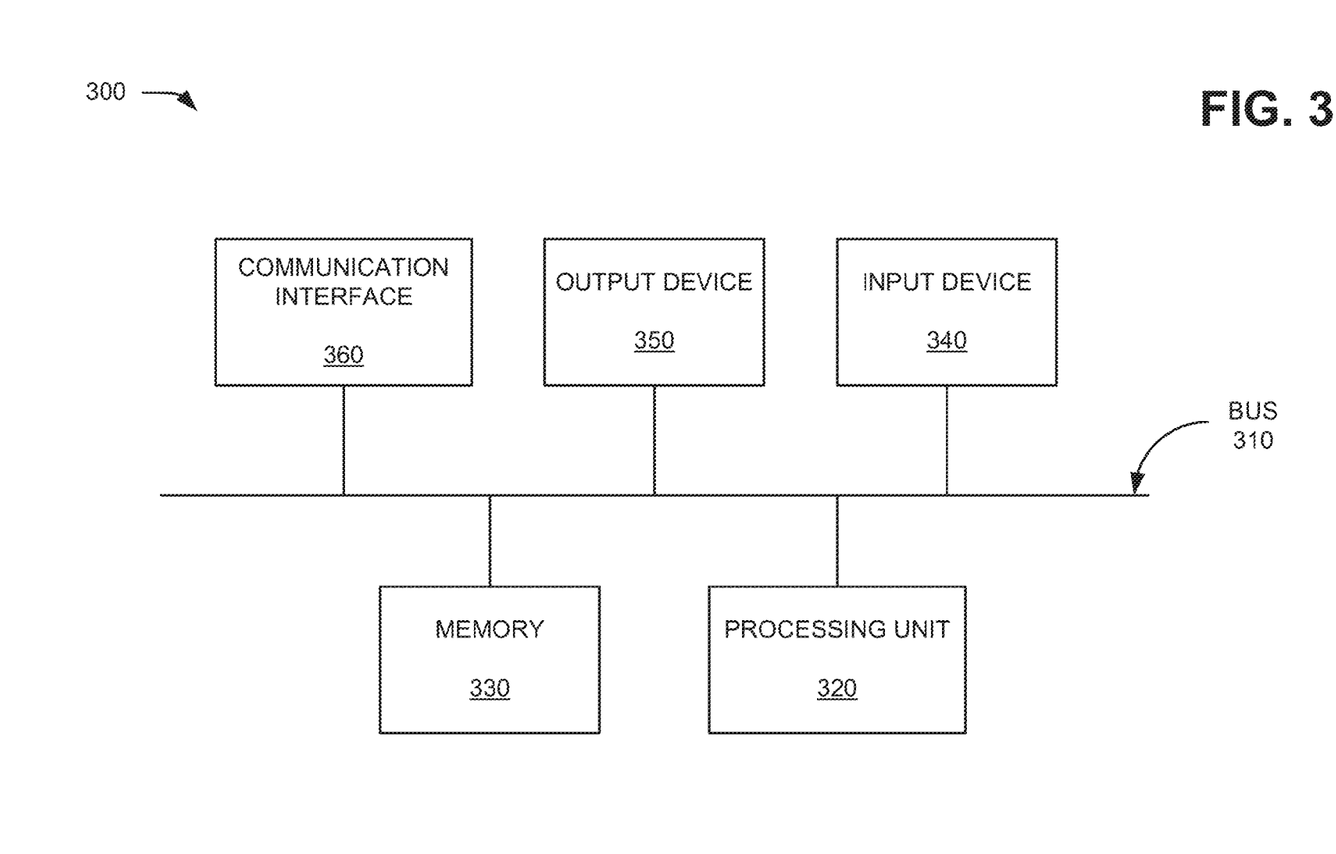
FIG. 3 is a diagram of exemplary components of one or more of the devices of the network depicted in FIG. 2.

FIG. 3 is a diagram of example components of a device 300 that may correspond to any one of the components of network 200. Each of VCMS 210, content delivery server 212, DRM server 214, data center 220, catalog server 222, application server 224, profile server 230, billing server 240, and user device 250 may be implemented/installed as a combination of hardware and software on one or more of devices 300. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage medium that stores information and instructions for execution by processing unit 320, a read only memory (ROM) or another type of static storage medium that stores static information and instructions for processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other components of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
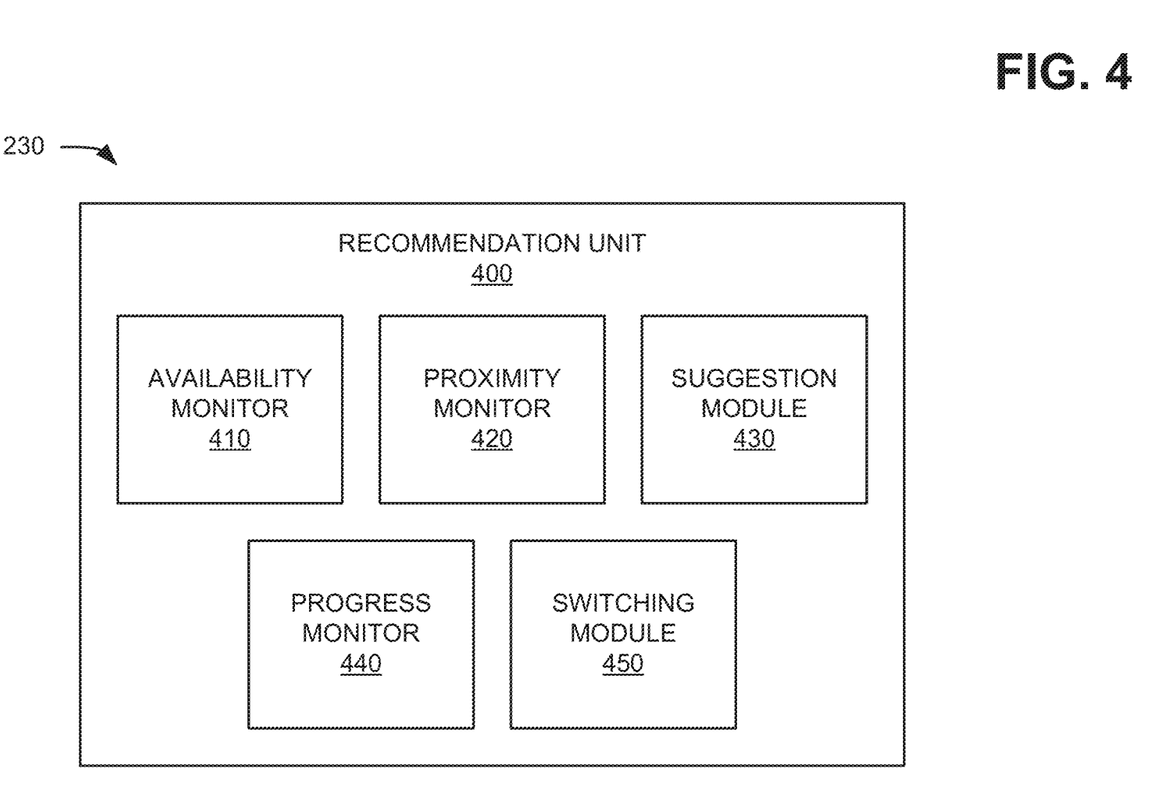
FIG. 4 is a block diagram of exemplary functional components of the profile server of FIG. 2.

FIG. 4 is a block diagram of exemplary functional components of profile server 230. In one implementation, the functions described in connection with FIG. 4 may be performed by one or more components of device 300 (FIG. 3). As shown in FIG. 4, profile server 230 may include a recommendation unit 400 that includes an availability monitor 410, a proximity monitor 420, a suggestion module 430, a progress monitor 440, and a switching module 540.

Availability monitor 410 may receive device status updates from user devices 250 and may associate the device status updates with a particular user account. Device status information may include, for example, an indication of whether a particular user device 250 is currently in use and/or indications of particular content being received by the particular user device. In another implementation, availability monitor 410 may receive device status updates about user devices 250 from other devices. For example, availability monitor 410 may receive device status information from a home router or a backend server that indicates a status of user device 250 based on network activity. Availability monitor 410 may compile user device status information associated with a single account and/or user and provide the compiled status information to suggestion module 430.

Proximity monitor 420 may track a last known location for each user device 250 and may associate the location information with other user devices under the same user account. Location information may include, for example, information provided by a user device 250 based on known network associations (e.g., known Wi-Fi or home networks) or location services, global positioning system (GPS) services. In some implementations, location information may include approximations. In another implementation, location information may include information from backend servers based on network usage information. Generally, location information may be sufficient to determine that a user may be within a reasonable distance to access another user device (e.g., that two user devices are within 100 feet of each other).

Suggestion module 430 may receive device status information (e.g., from availability monitor 410) and device location information (e.g., from proximity monitor 420). In one implementation, suggestion module 430 may detect if content being presented on one user device 250 could be presented more effectively (e.g., providing a better user experience and/or better quality) on another user device 250 associated with the same user account. In one implementation, suggestion module 430 may compare the type of content currently being presented to the user with a stored capability profile of other available devices. The capability profile may identify, for example, a screen size, resolution, input devices, connection type, etc.

Suggestion module 430 may monitor the availability and location of all user devices 250 associated with the particular account to determine if a different user device 250 is both available and geographically accessible to a user. In one implementation, suggestion module 430 may also compare features of the available (and geographically accessible) devices to determine if one of these devices can provide a better user experience for consuming the particular content. In one aspect, suggestion module 430 may signal the current user device 250 (e.g., the user device currently presenting particular content) to present a recommendation to switch the current presentation to a different available user device 250.

In one implementation, suggestion module 430 may compare the capability profile of available devices to the currently presented content to determine if an available user device 250 may offer a better user experience than the current user device 250. For example, for a VOD movie in high definition, suggestion module 430 may identify that a large-screen television (e.g., connected television 140), when available and in proximity, would provide a better user experience than a currently used tablet device (e.g., tablet 120). Conversely, for interactive gaming content, suggestion module 430 may determine that the currently used tablet device (e.g., tablet 120) provides the best available user experience, and suggestion module 430 would not provide a suggestion even if another device were available and proximate the user. In another implementation, the stored capability profile may include a quality ranking for each type of device to present particular types of content (e.g., video content, gaming content, etc.). For example, user devices (of the group of devices associated with a particular user account) may be ranked based on screen size and/or resolution for presenting linear video content (e.g., movies, live television, etc.). In another implementation, some or all features of suggestion module 430 may be included/managed locally on user devices 250.

Progress monitor 440 may mark progress of content provided to user device 250. In one implementation, progress monitor 440 may mark a time/duration within a linear content presentation that corresponds to a point where the user elects to switch devices. In another implementation, progress monitor 440 may use different mechanisms to track progress in terms of interactive and/or non-linear content.

Switching module 540 may facilitate a smooth transition of content presentation when a user elects to switch the current presentation to a different available user device 250. For example, switching module 50 may receive, from user device 250, a user's election to switch the current content presentation to a different device. Switching module 540 may retrieve a progress marker (e.g., from progress monitor 440) for the current content and notify application server 224 of a pending switch. In another implementation (e.g., when live content is being presented) no progress marker may be used. In one aspect, switching module 540 may provide content information to application server 224 to enable application server 224 to generate a streaming URL for a new session with the new user device 250.

Although FIG. 4 shows exemplary functional components of profile server 230, in other implementations, profile server 230 may include fewer functional components, different functional components, differently-arranged functional components, and/or additional functional components than depicted in FIG. 4. Alternatively, or additionally, one or more functional components of profile server 230 may perform one or more other tasks described as being performed by one or more other functional components of profile server 230.

Figure 5:
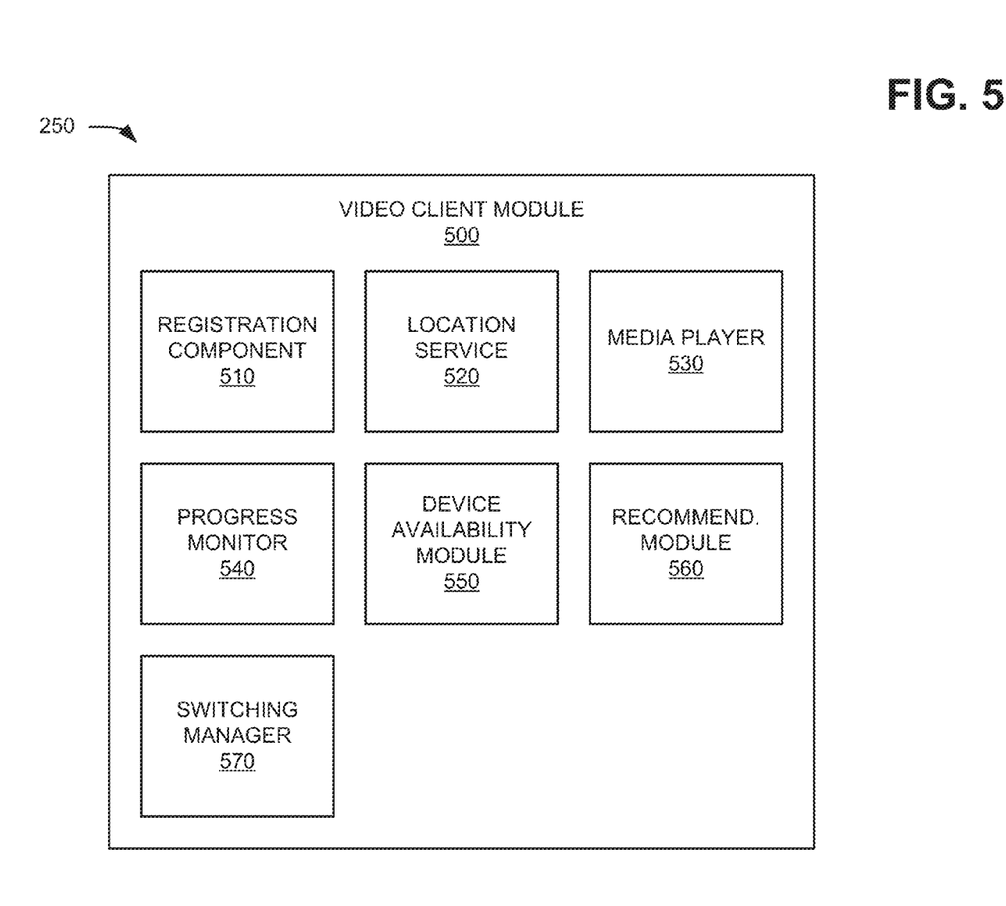
FIG. 5 is a block diagram of exemplary functional components of the user device of FIG. 2.

FIG. 5 is a block diagram of exemplary functional components of user device 250. In one implementation, the functions described in connection with FIG. 5 may be performed by one or more components of device 300 (FIG. 3). As shown in FIG. 5, user device 250 may include a video client module 500 that includes a registration component 510, a location service 520, a media player 530, a progress monitor 540, a device availability module 550, and a recommendation module 560.

Registration component 510 may include an interactive client interface that allows a user to request a list of available content (e.g., digital and/or physical content) and select from the list of available content. Registration component 510 may also include an account login interface. Registration component 510 may request, from data center 220, a list of content available for streaming and may present the list of content to a user of user device 250. Registration component 510 may include an interactive client interface that allows a user provide inputs, such as user passwords, preferences, and selections from the list of available content. In one implementation, registration component 510 may indicate a user's selection (e.g., from the catalog) to data center 220 and, in return, receive session-specific information to obtain the selected content.

Location service 520 may log location information, such as a last known location of user device 250. Location information may be based on, for example, a registered location for a fixed device, positioning (e.g., GPS) information, or associated network information (e.g., known Wi-Fi or home networks). In another implementation, location information may include information provided from backend servers based on network usage information, cell tower use, etc.

Media player 530 may manage content presentation and digital rights management. For example, media player 530 may initiate a connection with DRM server 214 to obtain one or more secure key(s), such as a decryption key that permits user device 250 to decrypt video content selected by a user. Media player 530 may also initiate a connection with content delivery server 212 to retrieve content selected by the user and decrypt protected content based on information from DRM server 214.

Progress monitor 540 may bookmark progress of content presentation on user device 250. In one implementation (e.g., in the absence of progress monitor 440 of profile server 230), progress monitor 540 may mark a time/duration within a linear content presentation that corresponds to a point where the user elects to switch devices. In another implementation, progress monitor 540 may use different mechanisms to track progress in terms of an interactive and/or non-linear content. In another implementation, progress monitor 540 may be included as a feature within media player 530.

Device availability module 550 may monitor whether activity by media player 530 or another application running on user device 250 is indicative of user device 250 being "in use" (e.g., in a state that precludes simultaneous access by a different user). In one implementation, device availability module 550 may provide status information for device 250 to profile server 230. For example, device availability module 550 may provide status information on a periodic basis (e.g., every 20 seconds, every minute, etc.) or upon receiving a request from profile server 230. The status information may include information similar to that received from profile server 230 for other user devices 250, such as an availability indication and a location (e.g., as determined by location service 520). In one implementation, device availability module 550 may be included as a separate application from the rest of video client module 500 that continuously runs as a background executable on user device 250.

Recommendation module 560 may receive (e.g., from profile server 230) device status information for other devices and may provide device status information to profile server 230. In one implementation, recommendation module 560 may receive "raw" status information for other user devices 250 and filter the raw data to determine if another user device 250 (e.g., with more effective presentation capabilities) is both available and in the proximity of the current user device 250. For example, recommendation module 560 may receive device status information that includes an availability indication and a location for another user device 250. Recommendation module 560 may also compare the location information of the available device with current location information from location service 520. Recommendation module 560 may determine if the device is configured to provide a better user experience than the current user device 250. For example, recommendation module 560 may employ features similar to those described above in connection with suggestion module 430. If recommendation module 560 detects that a better device is available and in proximity to the current user device 250, recommendation module 560 may generate an alert message (or notice) to the user to suggest switching devices.

Figure 6:
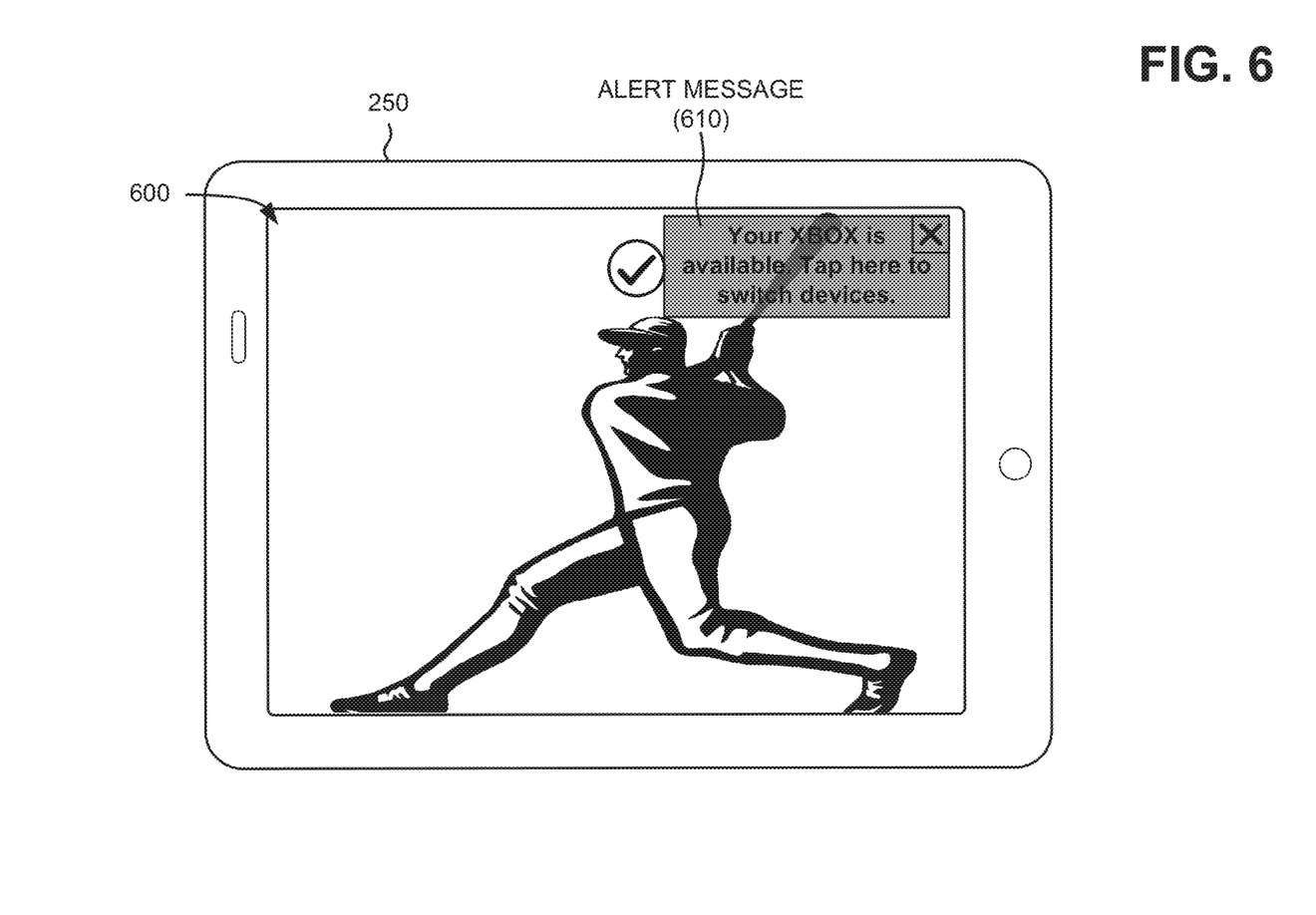
FIG. 6 is an exemplary recommendation user interface, according to an implementation described herein.

FIG. 6 provides an exemplary user interface 600 for an alert message 610, according to an implementation described herein. As shown in FIG. 6, in one implementation, recommendation module 560 may provide alert message 610 as an overlay on existing content. Alert message 610 may indicate to a user that a particular user device (with a more effective presentation) is available. In one implementation, alert message 610 may also provide an interactive link that the user may select to initiate the switch. If a user taps, for example, alert message 610 to indicate a desire to switch devices, recommendation module 560 may detect the user input and signal switching manager 570 to initiate a switch the current presentation of content to another user device 250.

Referring again to FIG. 5, switching manager 570 may receive a signal to switch presentation of a current content presentation to another user device 250. The signal may cause switching manager 570 to pause or stop the content presentation by media player 530 and retrieve a bookmark from progress monitor 540. Switching manager 570 may then provide a signal to one of the backend servers to initiate a new session with a client application (e.g., video client module 500) on the different user device 250 identified, for example, in alert message 610. In one implementation, switching manager 570 may provide a content identifier, a device identifier, and the bookmark to data center 220 to facilitate a seamless transition to the different user device 250.

Although FIG. 5 shows exemplary functional components of user device 250, in other implementations, user device 250 may include fewer functional components, different functional components, differently-arranged functional components, and/or additional functional components than depicted in FIG. 5. Alternatively, or additionally, one or more functional components of user device 250 may perform one or more other tasks described as being performed by one or more other functional components of user device 250.

Figure 7:
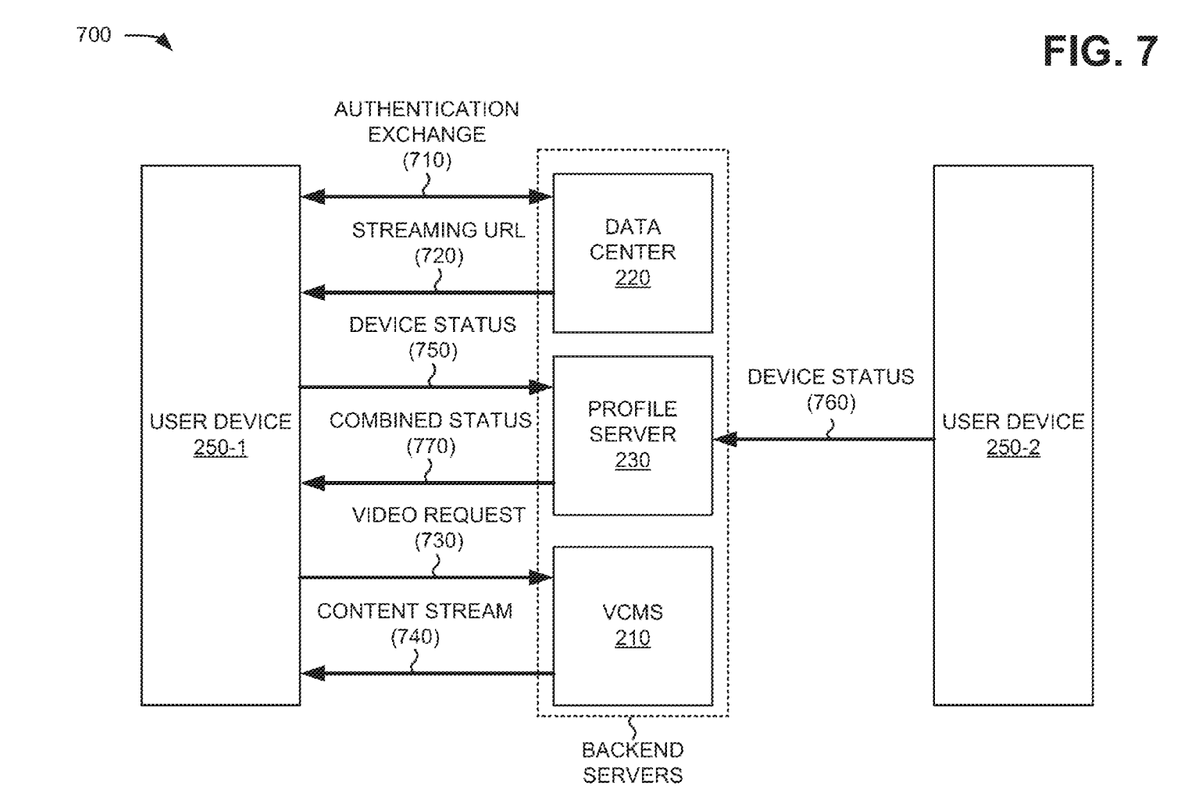
FIG. 7 is a diagram of exemplary communications among a portion of the network of FIG. 2.

FIG. 7 is a diagram of exemplary communications among a portion 700 of network 200. As shown in FIG. 7, network portion 700 may include two different user devices 250 (indicated as user devices 250-1 and 250-2), VCMS 210, data center 220, and profile server 230. The particular arrangement and number of components of network portion 700 are illustrated for simplicity. In practice there may be more user devices 250, VCMS 210, data center 220, and/or profile servers 230.

Communications in FIG. 7 may include communications to provide device status information to a user device (e.g., user device 250-1) for recommending a different user device (e.g., user device 250-2). User device 250-1 and user device 250-2 may include a video client application (e.g., video client module 500) with some or all of the functional components described above in connection with FIG. 5. In the example described herein, user device 250-1 may be, for example, a smart phone (e.g., smart phone 110), while user device 250-2 may be a television connected through a streaming device (e.g., monitor/streaming device 130).

Referring to FIG. 7, user device 250-1 may initiate an authentication exchange 710 with data center 220 (e.g., in response to a user's request for a catalog or selection of particular media content to purchase/rent). Authentication exchange 710 may include submission/verification of a user password or stored information to authenticate a user and/or user device 250-1.

Assuming user device 250-1 is authenticated, data center 220 may provide a streaming URL 720 to user device 250-1. Streaming URL 720 may enable user device 250-1 to access the selected content from VCMS 210 (e.g., in an optimal format for user device 250-1). User device 250-1 may use streaming URL 720 to retrieve the selected content from VCMS 210 as indicated by video request 730. In response to video request 730, VCMS 210 may provide a content stream 740 to user device 250-1 that may be presented to the user.

User device 250-1 (e.g., device availability module 550 of video client module 500) may provide a device status indication 750 to profile server 230. In one implementation, device status indication 750 may be provided via data center 220 to profile server 230. Based on the communication activities 710-740, device status indication 750 from user device 250-1 may report that user device 250-1 is "in use," along with an account identifier and a location indication for user device 250-1 (e.g., which may be based on local network devices or may be a particular GPS location).

Similarly, user device 250-2 (e.g., device availability module 550 of video client module 500) may provide a device status indication 760 to profile server 230. Based on a lack of communication activities, device status indication 760 from user device 250-2 may report that user device 250-2 is "available," along with an account identifier and a location indication for user device 250-2. In one implementation, device status indication 750 and/or device status indication 760 may be provided on a periodic basis (e.g., every 20 seconds, every minute, etc.). In still another implementation, device status indication 750 and/or device status indication 760 may be provided in response to a request (or ping) from profile server 230. Although not shown in FIG. 7, additional user devices 250 may also provide other device status indications to profile server 230.

Profile server 230 may receive device status indication 750 and device status indication 760. Profile server 230 may associate device status indication 750/760 with a particular account (e.g., based on the account identifier) and provide a combined status indication 770 to user device 250-1. In one implementation, combined status indication 770 may include status information (e.g., an "in use" or "available" indication with a location) for every user device 250 associated with the same account. In another implementation, combined status indication 770 may include information for user devices 250 excluding the status of user device 250-1. In still another implementation, profile server 230 simply forward device status indication 760 (and other status indications), when provided, as combined status information 770.

In one implementation, user device 250-1 (e.g., recommendation module 560) may receive combined status information 770 and may determine if content being presented on user device 250-1 could be presented more effectively on user device 250-2. Assuming, for example, combined status information 770 indicates user device 250-2 is both available and proximate to user device 250-1, user device 250-1 may recommend switching the current content presentation to user device 250-2 (as described further in connection with, for example, FIG. 8).

Figure 8:
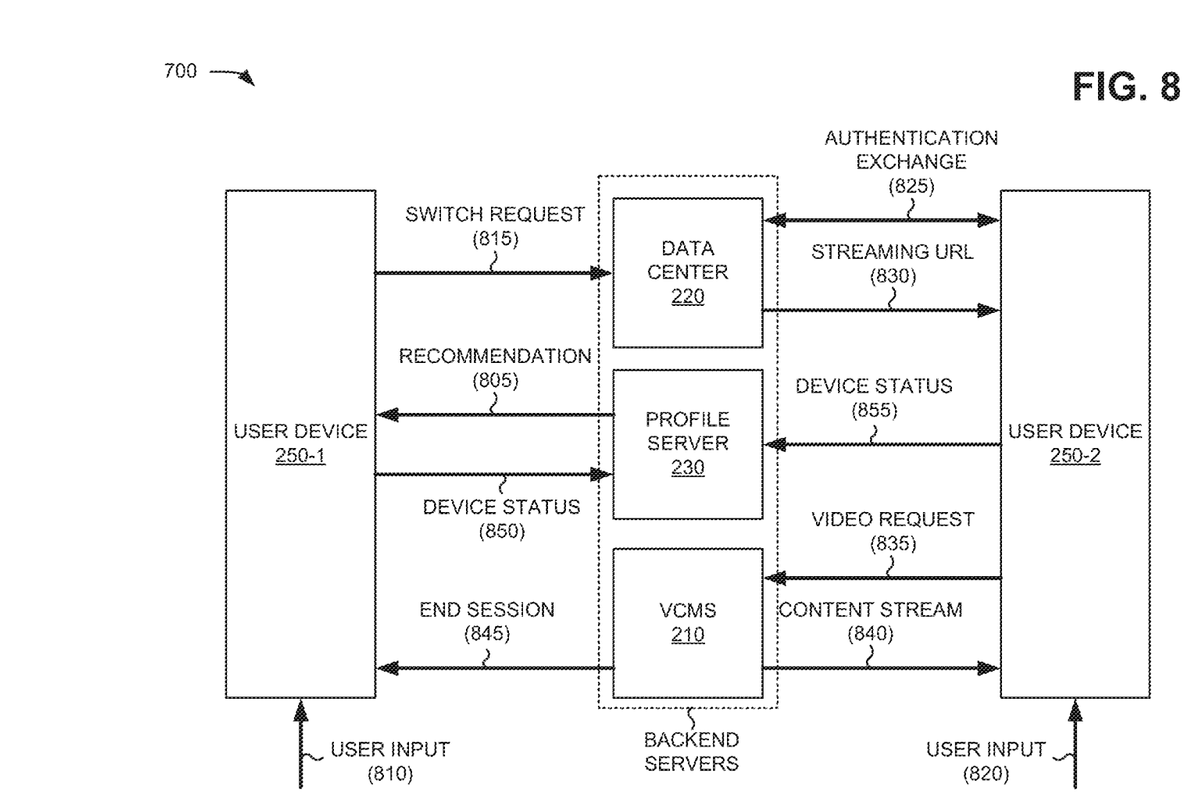
FIG. 8 is a diagram of additional exemplary communications among the portion of the network of FIG. 7.

FIG. 8 is a diagram of additional exemplary communications among portion 700 of network 200. Communications in FIG. 8 may include communications to switch content delivery from one user device (e.g., user device 250-1) to a different user device (e.g., user device 250-2) based on a user accepting a switching recommendation.

In contrast with FIG. 7, in FIG. 8 profile server 230 may provide a recommendation 805 to user device 250-1 to switch the current content presentation to user device 250-2. For example, based on device status indication 750 and device status indication 760 of FIG. 7, suggestion module 430 of profile server 230 may send recommendation 805 to user device 250-1.

Upon receiving recommendation 805 (or upon determining a recommendation based on combined status information 770 of FIG. 7), user device 250-1 may present a recommendation (e.g., alert message 610) to inform a user of user device 250-1 that user device 250-2 is available and to solicit user input to initiate a switch. Assuming the user wants to switch from user device 250-1 to present content on user device 250-2, the user may provide user input 810 (e.g., by tapping the appropriate area of user interface 600) to initiate the switch.

In response to user input 810, user device 250-1 (e.g., switching manager 570) may send a switch request 815 to data center 220. Switch request 815 may include, for example, a content identifier of the content in progress, a device identifier (e.g., for user device 250-2), and a bookmark or progress indication for the content. User device 250-2 may require some form of user input to turn on the device and/or activate a client application (e.g., video client module 500). User input 820 may cause user device 250-2 to initiate an authentication exchange 825 with data center 220. Authentication exchange 825 may include a submission/verification of a user password or stored information to authenticate a user and/or user device 250-2.

Assuming user device 250-2 is authenticated, data center 220 may provide a streaming URL 830 to user device 250-1 based on the information previously provided via switch request 815. Streaming URL 830 may enable user device 250-2 to access the selected content from VCMS 210 (e.g., in an optimal format for user device 250-2) at the point of interruption from the presentation on user device 250-1. User device 250-2 may use streaming URL 830 to retrieve the selected content from VCMS 210 as indicated by video request 835. In response to video request 835, VCMS 210 may provide a content stream 840, to user device 250-2, that may be presented to the user, resuming the previously presented content from user device 250-1 at the point of interruption (or, alternatively, resuming a live stream).

Once content stream 840 has been established, VCMS 210 (or another backend server) may signal user device 250-1 to end the previous content session, as indicated by reference number 845. User device 250-1 and user device 250-2 may provide updated device status indications 850 and 855, respectively, to indicate the changed status of each device. In one implementation, profile server 230 may receive device status indications 850 and 855 and may provide a combined status update to user device 250-2 in a similar manner to that of combined status indication 770 described above. In another implementation, profile server 230 may provide a recommendation, similar to recommendation 805, when a device status indication from a different user device 250 (e.g., associated with the same user account) indicates that another user device 250 (e.g., with more effective presentation capabilities) is both available and in the in proximity of the current user device 250.

Although FIGS. 7 and 8 show exemplary components of network portion 700, in other implementations, network portion 700 may include fewer components, different components, differently-arranged components, and/or additional components than depicted in FIGS. 7 and 8. Alternatively, or additionally, one or more components of network portion 700 may perform one or more other tasks described as being performed by one or more other components of network portion 700.

Figure 9:
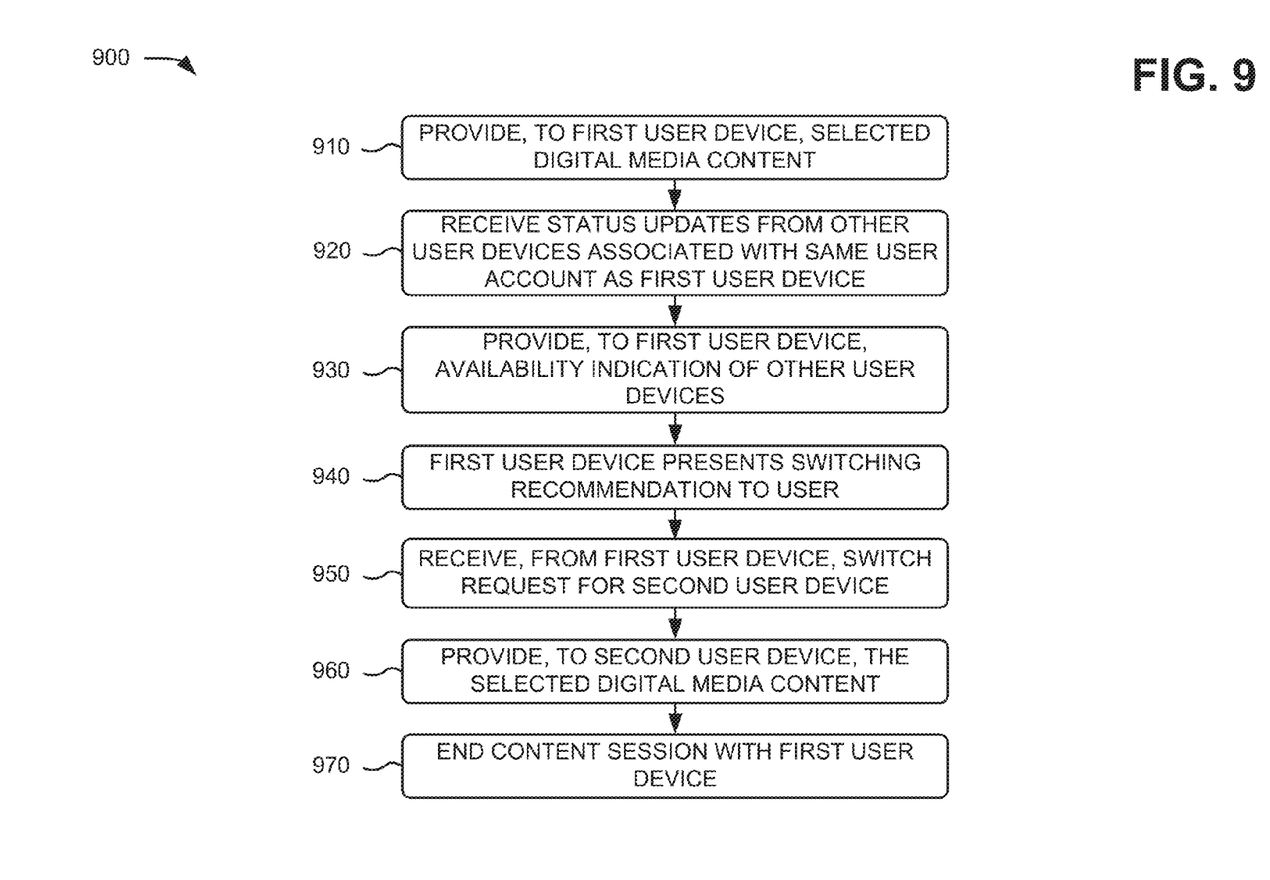
FIG. 9 is a flow chart of exemplary processes for providing a device recommendation on a user device, according to an implementation described herein.

FIG. 9 is a flow chart of an exemplary process 900 for providing a device recommendation on a user device, according to an implementation described herein. In one implementation, process 900 may be performed by profile server 230. In another implementation, some or all of process 900 may be performed by another device or group of devices, including or excluding profile server 230. For example, some or all of process 900 may be performed by user device 250 in conjunction with profile server 230.

As illustrated in FIG. 9, process 900 may include providing selected digital media content to a first user device (block 910). For example, user device 250-1 may establish a streaming session with VCMS 210 (e.g., content delivery server 212) to receive selected content.

Process 900 may include receiving status updates from other user devices associated with a same user account as the first user device (block 920) and providing an availability indication of other user devices to the first user device (block 930). For example, user device 250-2 (and other user devices) may provide a device status (e.g., device status indication 760) to profile server 230. Profile server 230 may compile device status updates associated with the same account as the user device 250-1 and provide the device status updates to user device 250-1 (e.g., as combined status indication 770). In another implementation, profile server 230 may use device status indication 760 to generate a switching recommendation (e.g., recommendation 805) as part of the availability indication.

Process 900 may include the first user device presenting a switching recommendation to the user (block 940). For example, in one implementation user device 250-1 may receive combined status indication 770 from profile server 230 and (based on the available devices and stored profiles of the device capabilities) generate a switching recommendation for a different user device (e.g., user device 250-2). In another implementation, user device 250-1 may receive recommendation 805 with a particular device (e.g., user device 250-2) already determined. User device 250-1 may present the switching recommendation to the user via, for example, alert message 610.

Process 900 may also include receiving, from the first user device, a switch request for a second user device (block 950), and providing the selected digital media content to the second user device (block 960). For example, a user may respond to alert message 610 to initiate a switch from user device 250-1 to user device 250-2. User device 250-1 may send a switch request (e.g., switch request 815) to data center 220 (e.g., application server 224). Data center may receive the switch request and automatically direct user device 250-2 to the appropriate content stream (e.g., via streaming URL 830) when user device 250-2 initiates a session with data center 220. User device 250-2 may use streaming URL 830 to resume presentation of the content previously shown on user device 250-1 (e.g., resuming at the point of interruption, if applicable).

Process 900 may further include ending the content session with the first user device (block 970). For example, VCMS 210 (or another backend server) may signal user device 250-1 to end the previous content session once a successful content stream with user device 250-2 is established.

According to systems and/or methods described herein a first user device may receive, from a service provider network, digital media content and may present the digital media content to a user. The first user device may receive, from the service provider network, an indication that a second user device, associated with an account of the user and providing a higher quality presentation, is available to present the content stream. The first user device may determine, based on the indication, if the second user device is in proximity to the first user device. If the second user device is in proximity to the first user device, the first user device may present a notice to the user that the second user device is available. In one implementation, the notice may include an interactive user interface that enables the user device to receive a user selection and initiate a seamless transition to the second user device.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. Further, while a series of blocks have been described with respect to FIG. 9, the order of the blocks may be varied in other implementations. Moreover, non-dependent acts may be implemented in parallel. Additionally, other processes described in this description may be varied and/or acts performed in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, by a first user device and from a service provider network, digital media content of a first type;
presenting, by the first user device, the digital media content via a first media presentation platform;
receiving, by the first user device and from the service provider network, an indication that at least one second user device, different than the first user device and associated with a same user account as the first user device, is available to present the digital media content of the first type via an alternative media presentation platform that is of a higher quality than the first media presentation platform; and
presenting, by the first user device, a notice that the at least one second user device is available to present the digital media content via the alternative media presentation platform.

2. The method of claim 1, further comprising:
comparing various media presentation capabilities associated with the at least one second user device to corresponding media presentation capabilities associated with the first user device, wherein the various media presentation capabilities include at least one of display dimensions, display resolution, bandwidth, input devices, or a connection type; and
determining, by the first user device and based on the comparing, that the at least one second user device provides the alternative media presentation platform that is of the higher quality for presenting the digital media content of the first type.

3. The method of claim 1, further comprising:
determining, by the first user device and based on the received indication, that a third user device, different than the first user device and associated with the same user account as the first user device, is in proximity to the first user device; and
determining that the third user device does not provide an alternative media presentation platform that is of a higher quality than the first media presentation platform for presenting the digital media content of the first type, wherein the notice does not indicate that the third user device is available to present the digital media content via the alternative media presentation platform.

4. The method of claim 1, wherein the notice includes an interactive user interface to receive user input to indicate a desire to switch the presentation of the digital media content from the first user device to the at least one second user device.

5. The method of claim 1, further comprising:
receiving, in response to the notice, user input to indicate a desire to switch the presentation of the digital media content from the first user device to the at least one second user device.

6. The method of claim 5, further comprising:
sending, to the service provider network, a switch request to initiate a change in the presentation of the digital media content from the first user device to the at least one second user device.

7. The method of claim 1, wherein the indication that the at least one second user device is available to present the digital media content includes an approximate location of the at least one second user device.

8. The method of claim 1, further comprising:
sending, by the first user device and before receiving the digital media content from the service provider network, status information that indicates the first user device is not being used.

9. The method of claim 8, wherein the status information further indicates an approximate location of the first user device.

10. The method of claim 1, wherein the first user device is one of a personal communications system (PCS) terminal, a tablet computer, a smart phone, a personal computer, or a laptop computer; and
wherein the at least one second user device comprises at least one of a gaming console, an Internet television, or a digital video recorder (DVR) rental terminal.

11. A method performed by one or more network devices in a service provider network, the method comprising:
providing, by one of the network devices and to a first user device, digital media content of a first type for presentation having a first media presentation quality;
receiving, by one of the network devices, status updates from a plurality of other user devices that are associated with a same user account as the first user device;
providing, by one of the network devices and to the first user device, an availability indication of one or more other user devices of the plurality of other user devices based on the status updates, wherein the availability indication indicates that each of the one or more other user devices is configured to present the digital media content of the first type having an alternative media presentation quality that is superior to the first media presentation quality;
receiving, by one of the network devices and from the first user device in response to the availability indication, a switch request to initiate a change in the presentation of the digital media content from the first user device to a second user device of the one or more other user devices; and
providing, by one of the network devices and to the second user device, the digital media content for presentation having the alternative media presentation quality.

12. The method of claim 11, further comprising:
in response to the receiving the switch request, stopping the providing by the one of the network devices and to the first user device, the digital media content.

13. The method of claim 12, wherein the digital media content for the second user device resumes from a point at which the digital media content for the first user device was stopped.

14. The method of claim 11, wherein the one or more other user devices comprises multiple user devices that are each configured to provide the digital media content with a relative media presentation quality with respect to the digital media content of the first type, and
wherein providing the availability indication includes presenting the multiple user devices in an order according to the relative media presentation qualities.

15. The method of claim 11, wherein the one or more other user devices comprises multiple user devices configured to provide the digital media content according to relative media presentation capabilities with respect to the digital media content of the first type, and
wherein providing the availability indication includes presenting a visual quality rating for each of the multiple other user devices corresponding to the relative media presentation capabilities with respect to the digital media content.

16. The method of claim 11, wherein providing the availability indication comprises:
determining, based on the status updates, that the first media presentation quality provided by the first user device for presenting the digital media content is of a higher quality than a second media presentation quality provided by at least one other user device of the plurality of other user devices with respect to the digital media content of the first type, wherein the availability indication does not identify the at least one other user device as being available to alternatively present the digital media content.

17. The method of claim 11, wherein providing the availability indication further comprises:
determining, based on the status updates, that the one or more other user devices is in proximity to the first user device.

18. The method of claim 11, wherein the digital media content includes streaming media or interactive gaming content.

19. One or more network devices, comprising:
a memory configured to store instructions; and
one or more processors configured to execute instructions in the memory to:
provide, to a first user device, streaming content of a first type for presentation according to first media presentation capabilities associated with the first user device;
receive status updates from a plurality of other user devices, wherein the status updates include:
relative media presentation capabilities associated with each of the plurality of other user devices with respect to the streaming content of the first type,
an availability status of each of the plurality of other user devices, and
a location for each of the plurality of other user devices; and
provide, to the first user device, an availability indication of one or more other user devices of the plurality of other user devices based on the status updates and indicating that each of the one or more other user devices is configured to present the streaming content according to the relative media presentation capabilities that exceed the first media presentation capabilities.

20. The network device of claim 19, wherein the one or more processors are further configured to:
- determine, based on the status updates, that a second user device of the plurality of other user devices is not configured to present the streaming content according to media presentation capabilities that exceed the first media presentation capabilities, wherein the availability indication does not identify the second user device.

21. The network device of claim 19, wherein the one or more processors are further configured to:
- receive, from the first user device, a switch request to initiate a change in the presentation of the streaming content from the first user device to a second user device of the one or more other user devices; and
- provide, to the second user device and based on the switch request, the streaming content for presentation according to media presentation capabilities that exceed the first media presentation capabilities.

22. The network device of claim 19, wherein the one or more processors are further configured to:
- associate the plurality of other user devices with a same user account of the first user device.

23. The network device of claim 19, wherein the availability indication includes a visual quality rating, for each of the one or more other user devices, related to the relative media presentation capabilities for presenting the streaming content.

* * * * *